United States Patent
Chapman et al.

(10) Patent No.: US 8,783,880 B2
(45) Date of Patent: Jul. 22, 2014

(54) RULABLE MULTI-DIRECTIONAL PRISM CLUSTER RETROREFLECTIVE SHEETING

(75) Inventors: Steven R. Chapman, Glenview, IL (US); Feng Wu, Lake Zurich, IL (US); Ethelbert Galicia, Lincolnwood, IL (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 13/286,505

(22) Filed: Nov. 1, 2011

(65) Prior Publication Data

US 2013/0107364 A1    May 2, 2013

(51) Int. Cl.
  *G02B 5/124*    (2006.01)
(52) U.S. Cl.
  USPC .......................................................... 359/530
(58) Field of Classification Search
  USPC ................................................. 359/529, 530
  See application file for complete search history.

(56) References Cited

U.S. PATENT DOCUMENTS

| | | | |
|---|---|---|---|
| 4,202,600 A | 5/1980 | Burke et al. | |
| 4,243,618 A | 1/1981 | Van Arnam | |
| 4,775,219 A | 10/1988 | Appeldorn et al. | |
| 5,112,902 A | 5/1992 | Moriya et al. | |
| 6,258,443 B1 | 7/2001 | Nilsen et al. | |
| 7,938,549 B2 * | 5/2011 | Mimura | 359/530 |
| 2009/0161217 A1 | 6/2009 | Mimura | |

FOREIGN PATENT DOCUMENTS

| | | |
|---|---|---|
| EP | 1965232 | 9/2008 |
| EP | 2267493 | 12/2010 |
| WO | 2007064033 | 6/2007 |
| WO | 2009122713 | 10/2009 |

* cited by examiner

*Primary Examiner* — Euncha Cherry
(74) *Attorney, Agent, or Firm* — Avery Dennison Corporation

(57) ABSTRACT

A rotationally insensitive, retroreflective prismatic sheeting and method of manufacture is provided. The sheeting includes discrete clusters of cube corners that are separated from one another on all sides by a textured surface. Each of the cube corners in each cluster has a base edge that is not collinear or parallel with the base edges of cube corners on either side of it. The array of cube corners clusters is rulable, and the cube corners have different orientations. Four or more of the cube corners in each cluster may have edges that converge into a central point within the cluster, and the cube corners of the clusters may include at least two symmetrical pairs of cube corners. The shapes of the cube corner clusters may be polygonal, and all of the cube corners may share a common vertex located at the center of the polygonal shape.

29 Claims, 17 Drawing Sheets

Efficiency of quartets

| Cant (°) | Retro FF | Cap-Y FF | Waste | Retro Waste |
|---|---|---|---|---|
| -19.47 | 0.320 | 0.608 | 0.072 | 0.183 |
| -13.33 | 0.077 | 0.898 | 0.026 | 0.250 |
| -9.74 | 0.444 | 0.372 | 0.184 | 0.293 |
| -6.55 | 0.142 | 0.787 | 0.071 | 0.333 |
| 0.00 | 0.250 | 0.567 | 0.183 | 0.423 |
| 5.26 | 0.320 | 0.360 | 0.320 | 0.500 |
| 11.17 | 0.163 | 0.600 | 0.237 | 0.592 |
| 14.56 | 0.099 | 0.721 | 0.181 | 0.646 |
| 15.79 | 0.120 | 0.640 | 0.240 | 0.667 |
| 20.79 | 0.055 | 0.779 | 0.166 | 0.750 |

FIG. 21

RULABLE MULTI-DIRECTIONAL PRISM CLUSTER RETROREFLECTIVE SHEETING

TECHNICAL FIELD

This invention generally relates to prismatic retroreflective sheeting, and is specifically concerned with a rulable prismatic sheeting having retroreflective properties that appear substantially the same to an observer regardless of the rotational orientation of the sheeting.

BACKGROUND OF THE INVENTION

The ability of retroreflective sheeting to have the same observable retroreflective brightness regardless of the angular orientation of the sheeting on the sign has long been a desirable feature in prismatic retroreflective sheeting. This property is hereinafter referred to as "rotational insensitivity". Early retroreflective sheeting made with glass bead technology had this feature. By contrast, the performance of prismatic retroreflective sheeting tends to be strongly sensitive to rotation in the plane of the sheeting. Consequently, if an observer directed a flashlight beam at such a retroreflective sheet while the sheet rotated, the sheet would appear to the observer to darken or lighten at least every 180° as the array of cube corner prisms on the sheet retroreflected a greater or lesser percentage of the flashlight beam. There are a number of applications of such retroreflective sheeting where it is applied in a variety of orientations (such as on automobile license plates, road cones, retroreflective strips on trucks, high visibility reflective tape, etc.) and consequently where rotational insensitivity is very much needed. There are also situations where different pieces of sheeting are placed next to each other, such as cut out letters on signs, a sign using more than one piece of sheeting, or two signs mounted next to each other. In such situations it is undesirable to introduce visual contrast between the pieces.

Various techniques have been proposed and used to minimize rotational sensitivity. One of the most common involves dividing the arrangement of cube corner prisms into adjacent groups of close-packed arrays of cube corner prisms referred to as "tiles". Each tile typically contains prism pairs with prisms in two opposite orientations. Different tiles can have prism pairs oriented differently, so that the combined effect of all the tiles has less sensitivity to rotation. However, the manufacture of such tiled arrays is more difficult than non-tiled arrays. Additionally, the different retroreflective patterns generated by the different tiles generate an undesirable visual contrast between the tiles when the sheeting is viewed at close distances. Other techniques include using cubes on laminae having sideways canting of the optical axes with alternating sign, in such a way as to reduce orientation sensitivity. While this technique moderates rotational sensitivity, the resulting product is still likely to be undesirably sensitive to rotation.

More recent proposed solutions utilize an assembly of multi-direction retroreflective elements. In one approach, assemblies of five, seven or more elements share two common base edges and a common vertex. This approach can provide an array of prisms having ten or more orientations, which in turn can provide good rotational insensitivity. It also avoids all the work involved in tiling, as well as the visual contrast between tiles which can be seen when the sheeting is viewed from a sufficiently close distance.

SUMMARY OF THE INVENTION

While the most recent approaches overcome some of the shortcomings of earlier attempts to provide rotationally insensitive prismatic retroreflective sheeting, many problems remain. To appreciate these problems, some understanding of the manufacturing techniques for prismatic retroreflective sheeting is required.

The prisms used in prismatic retroreflective sheeting are typically triangular shaped cube corner-type prisms due to the fact that continuous, close-packed arrays of such prisms can be formed by cutting a pattern of straight, intersecting V-shaped grooves (hereinafter referred to as "vee grooves") on the surface of a substrate, a replica of which can be used to mold the sheeting. A cube corner array that can be formed by a pattern of intersecting vee grooves is said to be a "rulable" array when each of the vee grooves is substantially straight, and directions of the vee grooves are all substantially parallel to a common plane. The cutting of the vee grooves on the surface of the substrate is relatively easily accomplished by a V-shaped diamond tool mounted on a rotating spindle. Hence a rulable array of cube corners is advantageously less expensive to manufacture than a non-rulable array.

The applicants have noted that the manufacture of the aforementioned prior art assemblies of five or seven or more cube corners sharing two common base edges and a common vertex requires either (1) cutting some vee grooves which do not follow continuous straight lines, but rather bent lines, or (2) cutting some vee grooves having a depth which varies along the length of the groove. Because conventional rotating V-shaped diamond tools do not lend themselves to the cutting of such bent, discontinuous or variable-depth vee grooves, the manufacture of such prior art cube corner assemblies is relatively expensive.

The invention solves the aforementioned problems by providing a retroreflective sheet having an array of cube corner prisms that is completely rulable and hence easily manufactured. The array comprises a plurality of discrete clusters of cube corners formed from a transparent material that are separated from one another on all sides by a surface, each cube corner having a base edge not collinear or parallel with the noncontiguous base edges of cube corners on either side of it, wherein the cube corners in each cluster are defined by a set of straight vee grooves, each groove having substantially a same depth throughout its length.

Four or more of the cube corners in each cluster may have edges that converge into a central point within the cluster, and the cube corners of the clusters may include at least two symmetrical pairs of cube corners. In some embodiments of the invention, one of the edges of each of the cube corners in the symmetrical pairs is at right angles to one of the edges of the two cube corners on either side of it. The shapes of the cube corner clusters may be polygonal, and all of the cube corners may share a common vertex located at the center of the polygonal shape. The cube corners within the cluster may be arranged in symmetrical pairs of cube corners about the common vertex.

The surface separating the discrete clusters of cube corners may be textured so as to be light-scattering. The surface separating the clusters may be flat, or defined by a vee groove or even a curved surface. When the separating surface is defined by a vee groove, the groove may be a continuation of the sides of cube corners in different clusters. The cube corner clusters may be uniformly spaced apart from one another such that the surface separating the clusters forms a uniform grid-like pattern.

The cube corners may be coated with specularly reflecting metal such as aluminum, or the sheeting may include a sealed backing film that provides air-cells behind the clusters. The sealed backing film may be attached to the surface separating the clusters.

The invention further encompasses a method for forming rotationally insensitive retroreflective prism sheeting comprising: forming cube corners in a substrate material by cutting a face of the substrate material with a pattern of substantially straight vee grooves, each vee groove having a same depth throughout its length, wherein the resulting cube corners have different orientations; providing a textured surface on the face of one of the substrate and a replica of the substrate that defines discrete cube corner clusters surrounded by a textured surface, and using one of the substrate and a replica thereof to form retroreflective prism sheeting from a transparent material having a plurality of discrete clusters of cube corners that are separated from one another on all sides by a textured surface, wherein each cube corner in the clusters has a base edge not collinear or parallel with the base edges of cube corners on either side of it, and cube corners in each cluster have different orientations.

Alternatively, the textured surface on the face of the substrate may be provided first, followed by providing discrete areas of raised material on the textured surface, followed by the step of cutting the discrete areas of raised material with a pattern of straight vee groove rulings to form the clusters of cube corners. Alternatively, channels could be cut first to define the surfaces between clusters. Texture could be provided to these channels and then the prisms could be cut.

The fact that different cube corners within the discrete clusters are differently oriented, and hence retroreflect light in patterns which are mutually complementary, advantageously provides a rotation-insensitive retroreflective prism sheeting. The ability of the cube corner clusters to be manufactured by a set of straight vee grooves, each of which maintains a constant direction through its length, renders the sheeting completely rulable and easily manufactured.

BRIEF DESCRIPTION OF THE DRAWINGS

FIG. 21 is a table that compares both the retroreflective and daytime reflective characteristics for embodiments of the inventive sheeting whose retroreflective cube corners in the cube corner clusters have different cants;

DETAILED DESCRIPTION OF THE EMBODIMENTS

Figure 1:
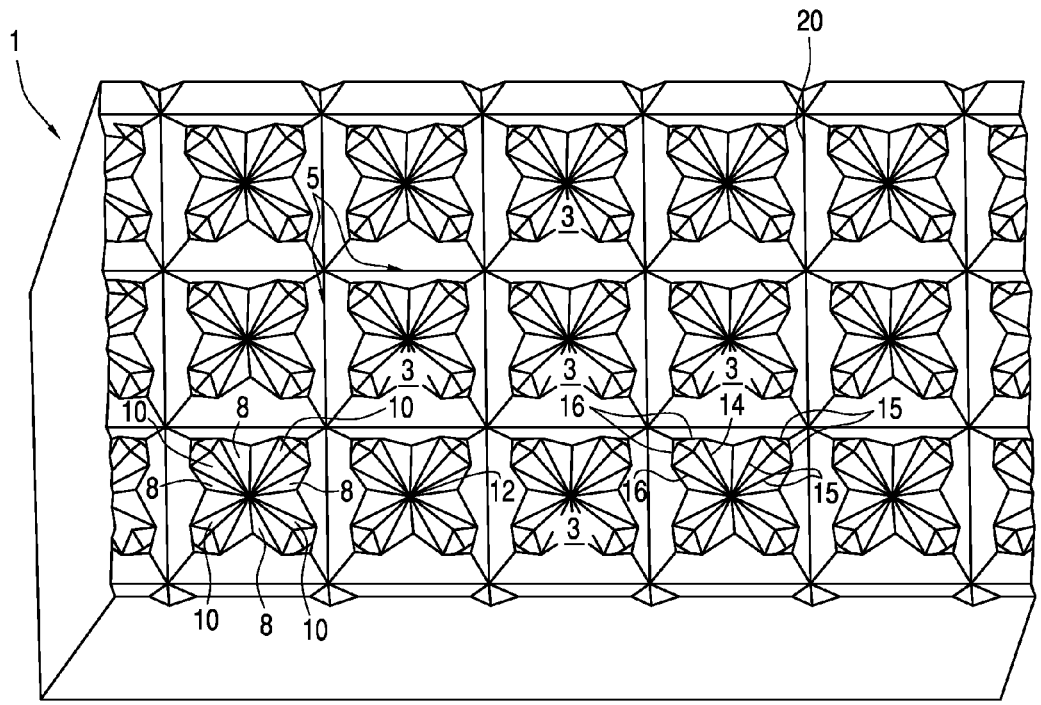
FIG. 1 is a plan view of a first embodiment of the retroreflective sheeting of the invention wherein the cube corner clusters are square-shaped and the separation surfaces between the cube corner clusters are vee grooves.
Figure 2:
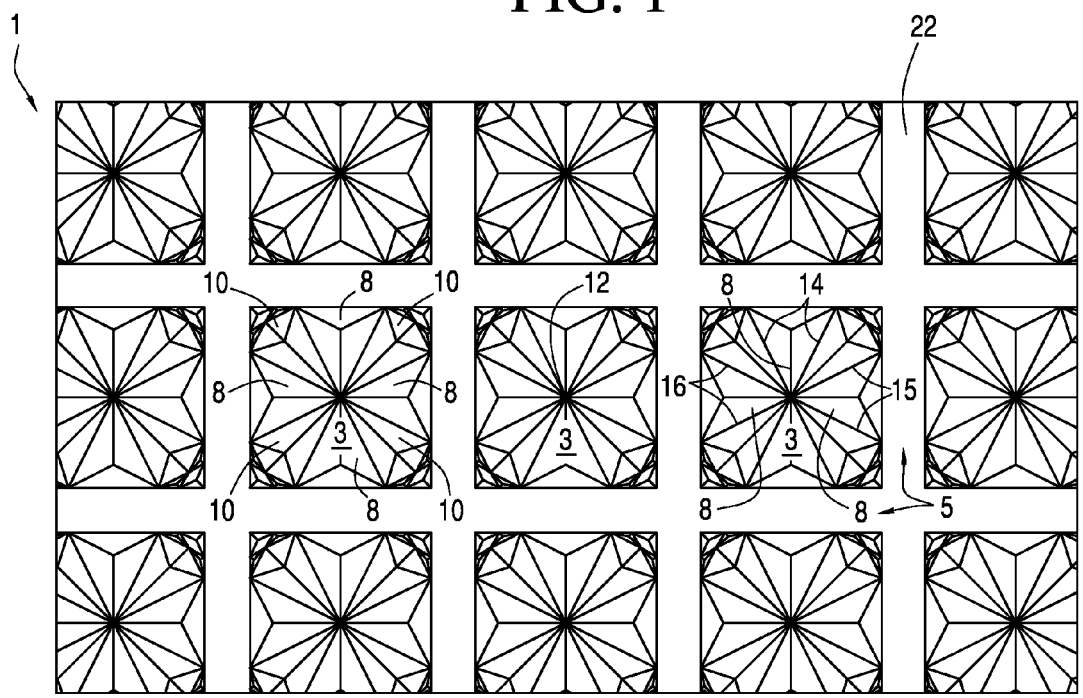
FIG. 2 is a plan view of a second embodiment of the retroreflective sheeting of the invention wherein the separation surfaces between the cube corner clusters are flat surfaces arranged in a grid-like pattern.

With reference to FIGS. 1 and 2, the retroreflective sheeting 1 of the invention includes a plurality of cube corner clusters 3 spaced-apart by separation surfaces 5 which completely surround each of the clusters 3. Each of the clusters 3 includes at least four retroreflective cube corners 8 separated by non-retroreflective prisms 10. In this application, clusters 3 having four retroreflective cube corners 8 are called quartet clusters. In all cases, each of the retroreflective cube corners 8 and non-retroreflective prisms 10 has a vertex 12 which, if not common to each of the cube corners 8 and prisms 10 (as it is in the FIGS. 1 and 2 embodiments), is at least aligned with a common focal point. In all cases, each of the retroreflective cube corners 8 includes a base edge 14 which is not collinear or parallel to noncontiguous bases edges 15, 16 of the cube corners 8 on either side of the cube corner 8. In both the FIG. 1 and FIG. 2 embodiments, the clusters 3 are formed by six sets of parallel cuts and the retroreflective cube corners 8 have a cant of 5.26° (edge more parallel).

The separation surfaces 5 may be in the shape of a vee-groove 20 (formed in this case from deep 60° cuts) as illustrated in FIG. 1, or they may be flat 22 as shown in FIG. 2. Such shapes are preferred as they are compatible with rulable manufacturing processes wherein sharp-tipped or flat-tipped vee-shaped rotating cutters are moved along a straight path to cut sets of parallel vee-grooves in the substrate. However, the shape of the separation surfaces 5 is not limited to vee-groove or flat shapes and may be for example have a curved or "C" shaped profile. As will be seen hereinafter, the separation surfaces 5 do not necessarily separate the cube corner clusters 3 by the same distances along different orthogonal axes, and are not necessarily squarely or rectangularly grid-shaped, particularly when the cube corner clusters 3 are neither square nor rectangular. Preferably, the separation surfaces provide highly efficient diffuse reflection (e.g. colored white or coated with a specular reflective material such as aluminum and textured so as to scatter reflected light). Efficiency can be boosted by using a texture with surface slopes limited to reduce the occurrence of multiple reflection scattering. The resulting high diffuse reflectivity of the separation surfaces 5 helps to increase the daytime luminance (CapY) of the sheeting 1. Increasing the daytime luminance of the sheeting 1 is particularly desirable in cases where the back of the sheeting 1 is metalized.

Figure 3:
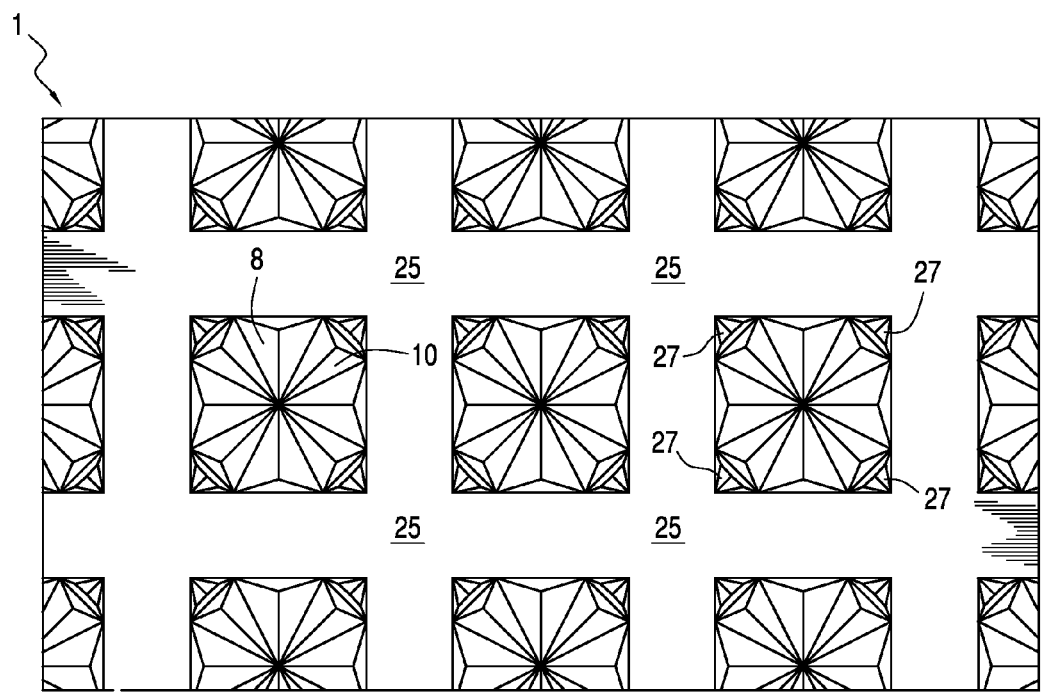
FIG. 3 is a plan view of a third embodiment of the retroreflective sheeting of the invention wherein the separation surfaces between the clusters have been widened to permit the cutting of additional prisms. These additional prisms are cube corners; the original prisms are not.

It should be noted that the separation surfaces of the FIG. 2 embodiment may be expanded into wider separation surfaces 5 to further increase the daytime luminance (CapY) of the sheeting 1, and also allow additional triangle-based pyramids to be formed in the corners of the clusters 3 by two additional sets of 45° cuts. In such an embodiment, such corner prisms would not be cube corners unless the previous six sets of angled cuts were done with cutters with a different included angle (83.6206° instead of 75.5225°), and the new 45° cuts are done with cutters having an included angle of 38.9424°. If such a cutting procedure were followed, then the four prisms formed in the corners of the clusters 3 would be functional retroreflective cube corners, as shown in FIG. 3.

Figure 4:
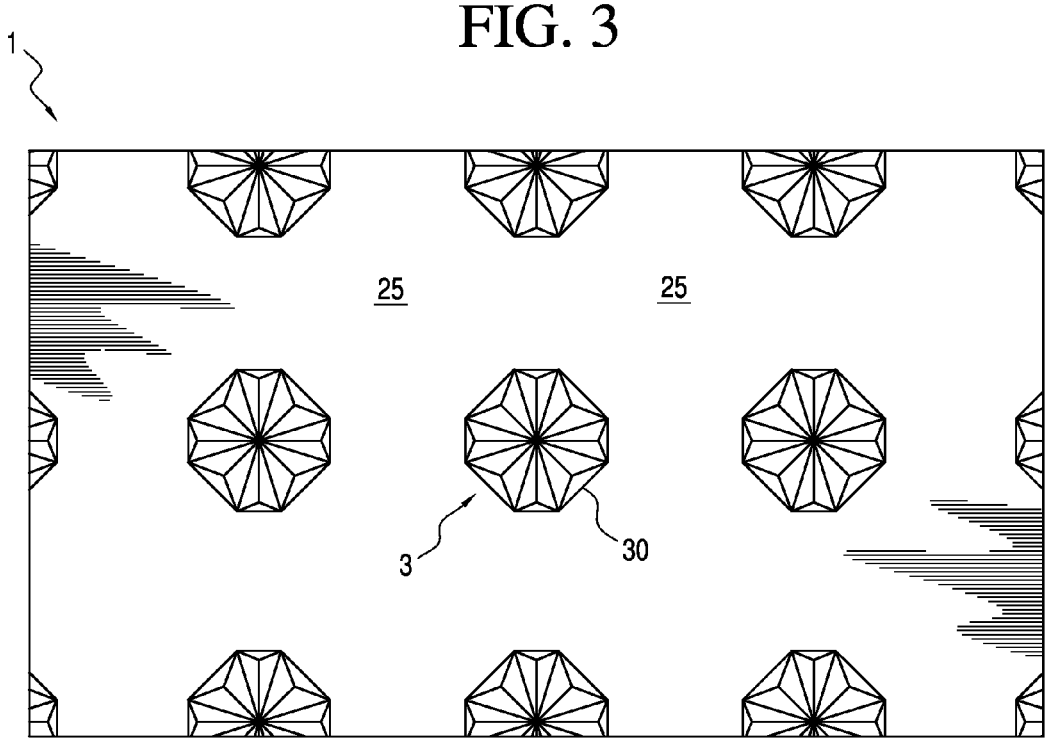
FIG. 4 is a plan view of a fourth embodiment of the retroreflective sheeting of the invention wherein the cube corner clusters are octagonal and uniformly spaced apart with respect to both x and y axes and the separation surfaces between the cube corner clusters are flat surfaces.

FIG. 4 is a plan view of a fourth embodiment of the inventive retroreflective sheeting 1 wherein the cube corner clusters 3 have an octagonal periphery 30 instead of square-shaped periphery and are uniformly spaced apart with respect to both x and y axes.

Figure 5:
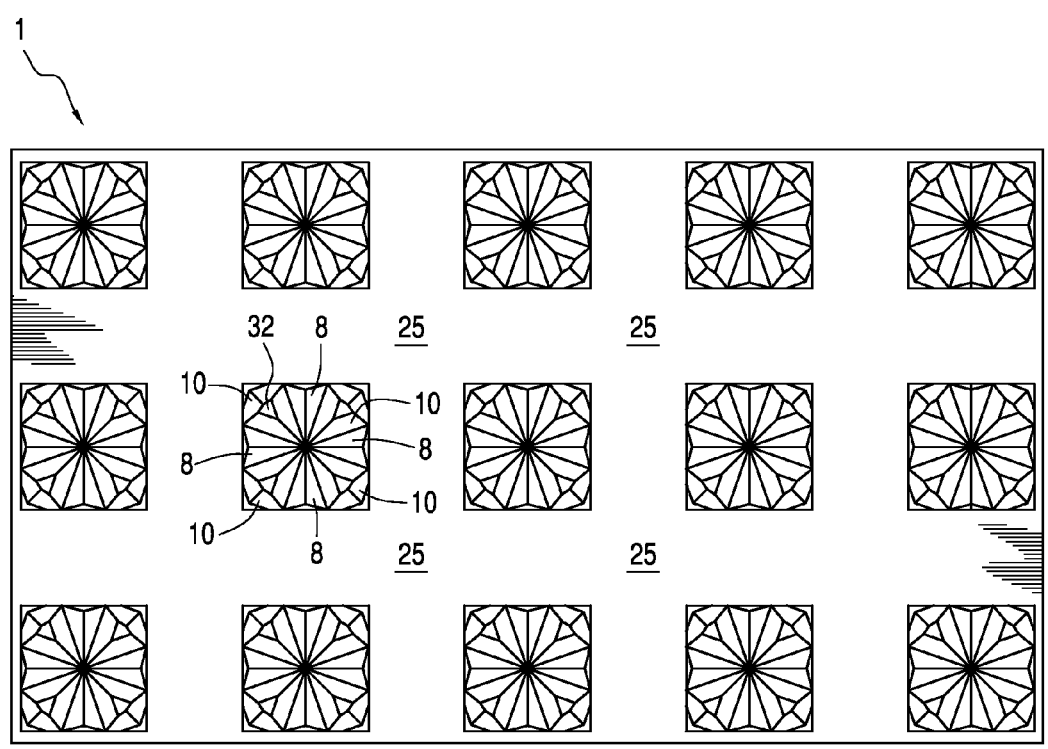
FIG. 5 is a plan view of a fifth embodiment of the retroreflective sheeting of the invention wherein the cube corner clusters are square and uniformly spaced apart with respect to both x and y axes and the non-retroreflective prisms between the retroreflective cube corners are truncated.

FIG. 5 is a plan view of a fifth embodiment of the retroreflective sheeting 1 wherein the cube corner clusters 3 are square and uniformly spaced apart with respect to both x and y axes and the non-retroreflective prisms 10 between the retroreflective cube corners 8 have truncated portions 32.

Figure 6:
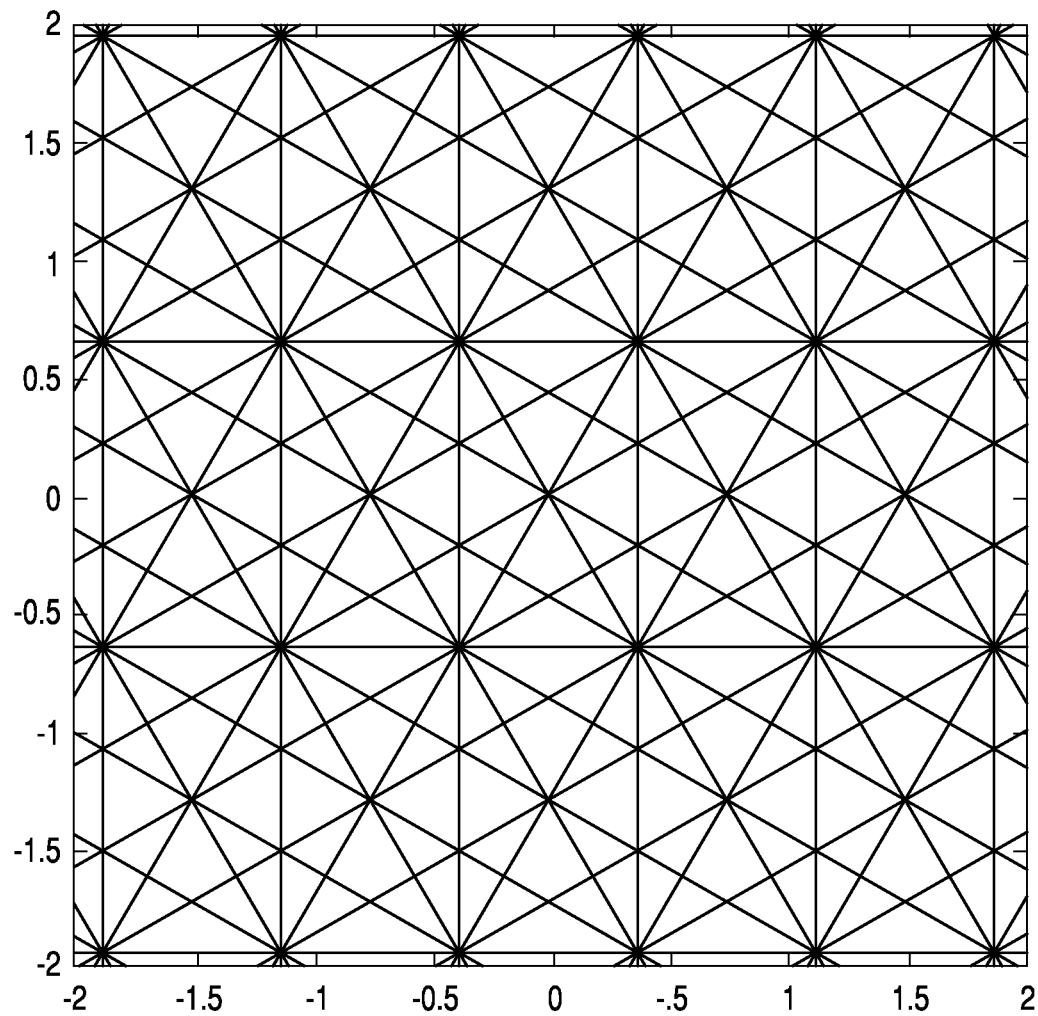
FIG. 6 is a schematic diagram of cutter paths which can create cube corner clusters having retroreflective cube corners with 0° cant.
Figure 7:
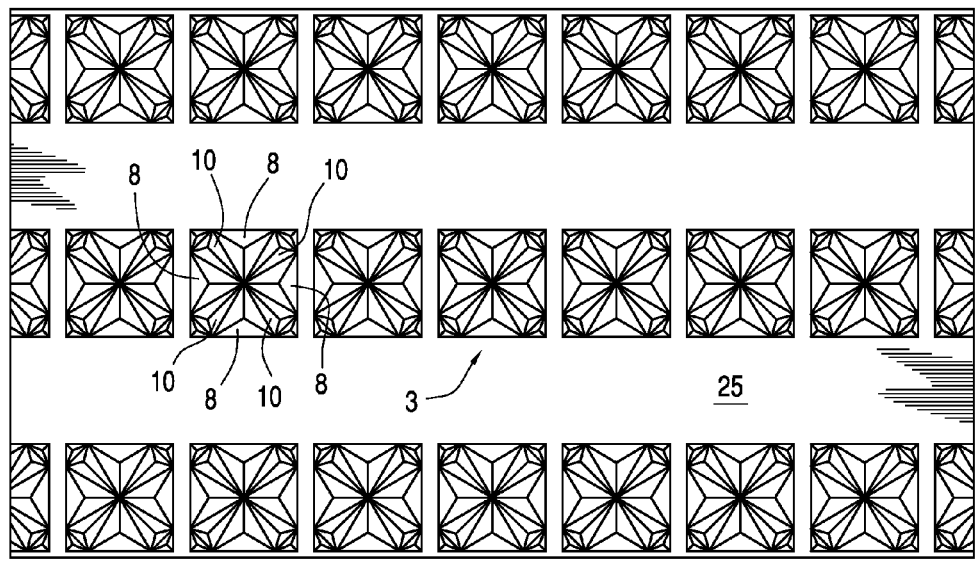
FIGS. 7 and 8 are plan views of sixth and seventh embodiments of the sheeting having cube corner clusters with 0° cant retroreflective cube corners which can be made via the cutter pattern of FIG. 7.
Figure 8:
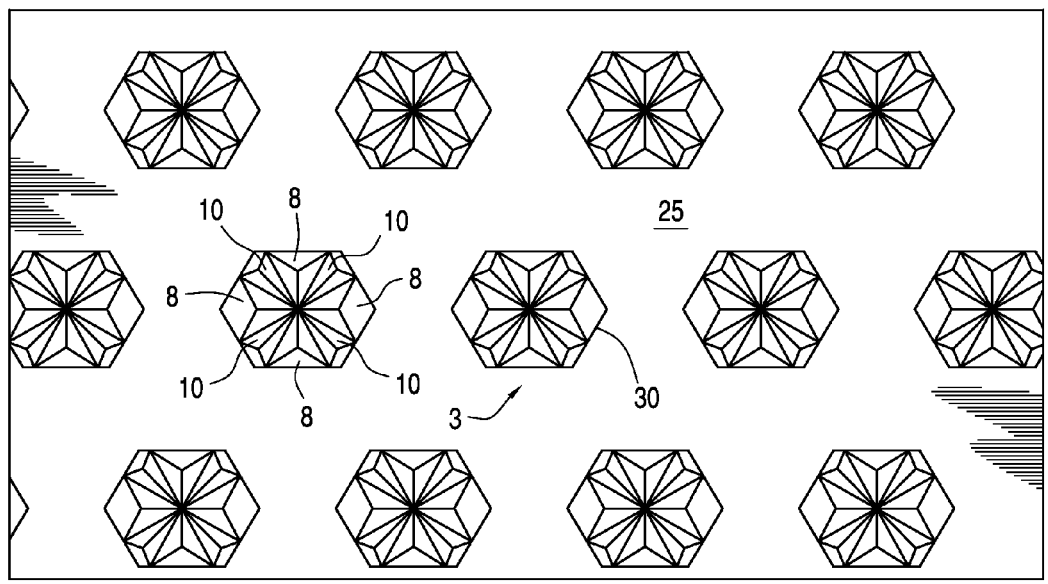

The embodiments of the sheeting 1 illustrated in FIGS. 1-5 illustrate that it is possible to cut an array of retroreflective cube corner prisms 8 with four orientations present, separated by 90°. As described in more detail hereinafter, the prisms 8 can have a number of different cants. It is also possible to create clusters 3 of uncanted prisms 8 with four orientations present, separated by 90°. FIG. 6 is a schematic diagram of cutter paths which can create cube corner clusters having retroreflective cube corners with 0° cant. FIGS. 7 and 8 illustrate sixth and seventh embodiments of the sheeting 1 having cube corner clusters 3 with 0° cant retroreflective cube corners 8 which can be made via the cutter pattern of FIG. 6.

In a modification of the embodiment shown in FIG. 3, it is also possible to cut an array of quartet cube corner clusters 3 having retroreflective prisms 8 with eight orientations present (e.g. some clusters with four central prisms 8 with a 5.3° cant oriented 0°/90°/180°/270° and other clusters with four prisms 8 with a 15.8° cant oriented 45°/135°/225°/315°) with separation surfaces 25 and prisms 27. This could be done by using two differently-angled cutters for the cuts passing through the center of the clusters 3. One cutter (included angle=75.5225°) would be suitable for making prisms 8 with a cant of about 5.3°. Another cutter (included angle=83.6206°) would be suitable for making prisms 10 with a cant of about 15.8°. By alternating between these cutters in the four groove sets passing through the centers of the clusters 3, two types of clusters can be made, i.e. a first type of cluster in which the four central prisms 8 oriented 0°/90°/180°/270° are retroreflective and a second type of cluster in which the prisms 10 oriented 45°/135°/225°/315° are retroreflective.

Figure 9:
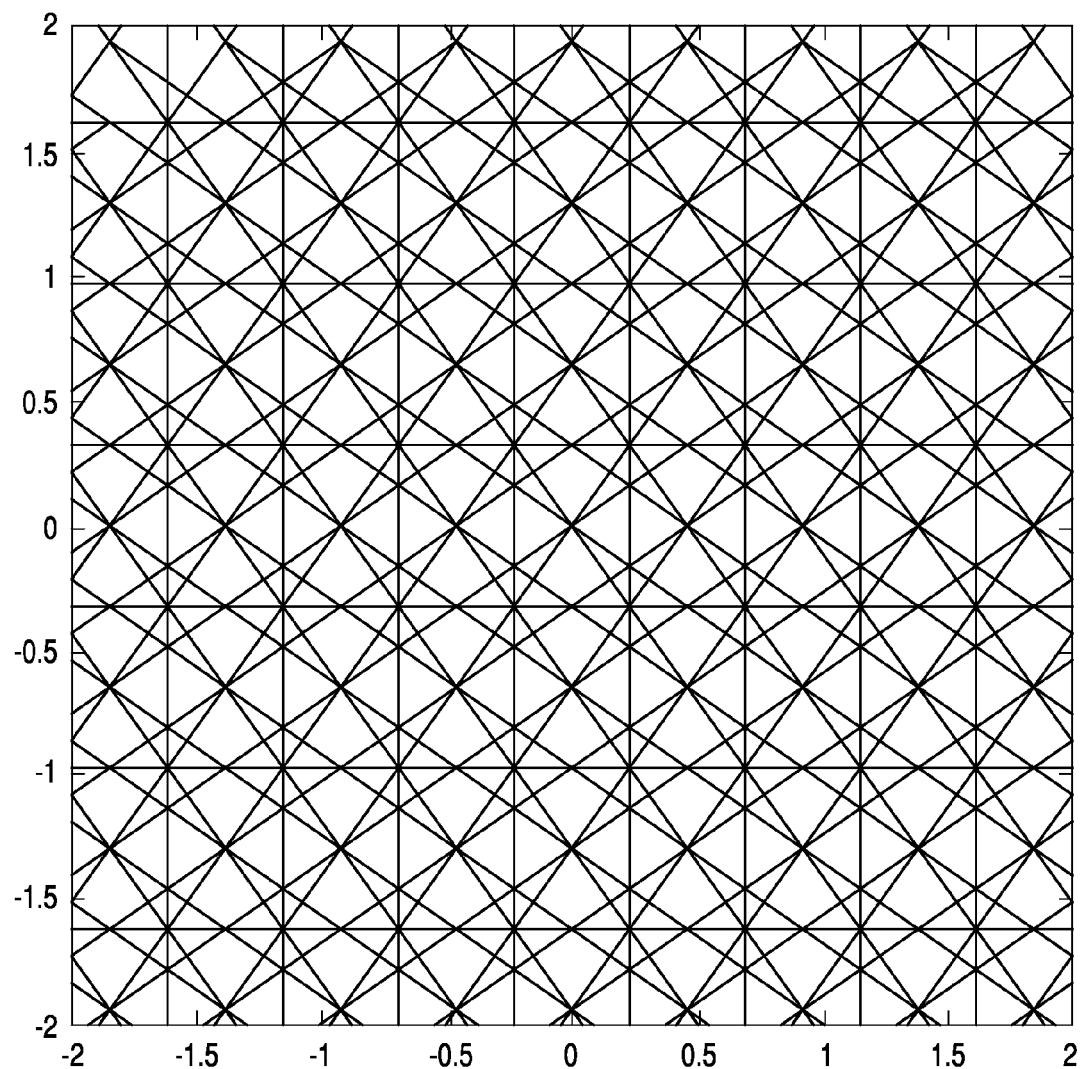
FIG. 9 is a schematic diagram of cutter paths which can create cube corner clusters having retroreflective cube corners with a cant of −9.74°.
Figure 10:
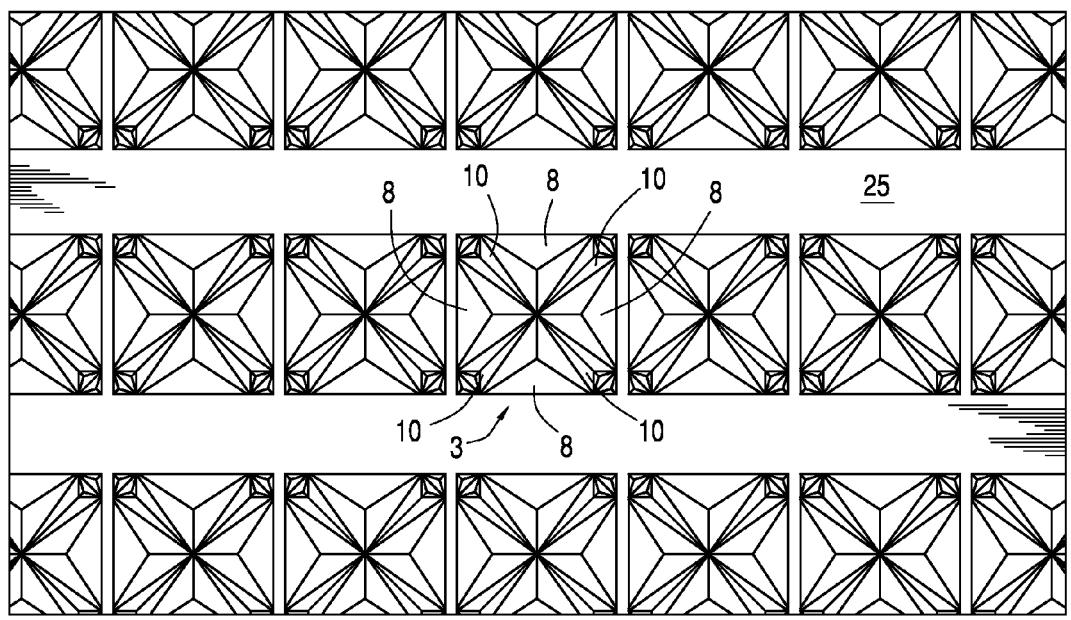
FIG. 10 is a plan view of a eighth embodiment of the retroreflective sheeting formed by the schematic diagram of FIG. 10 having cube corner clusters that each include cube corners having a cant of −9.74°.
Figure 11:
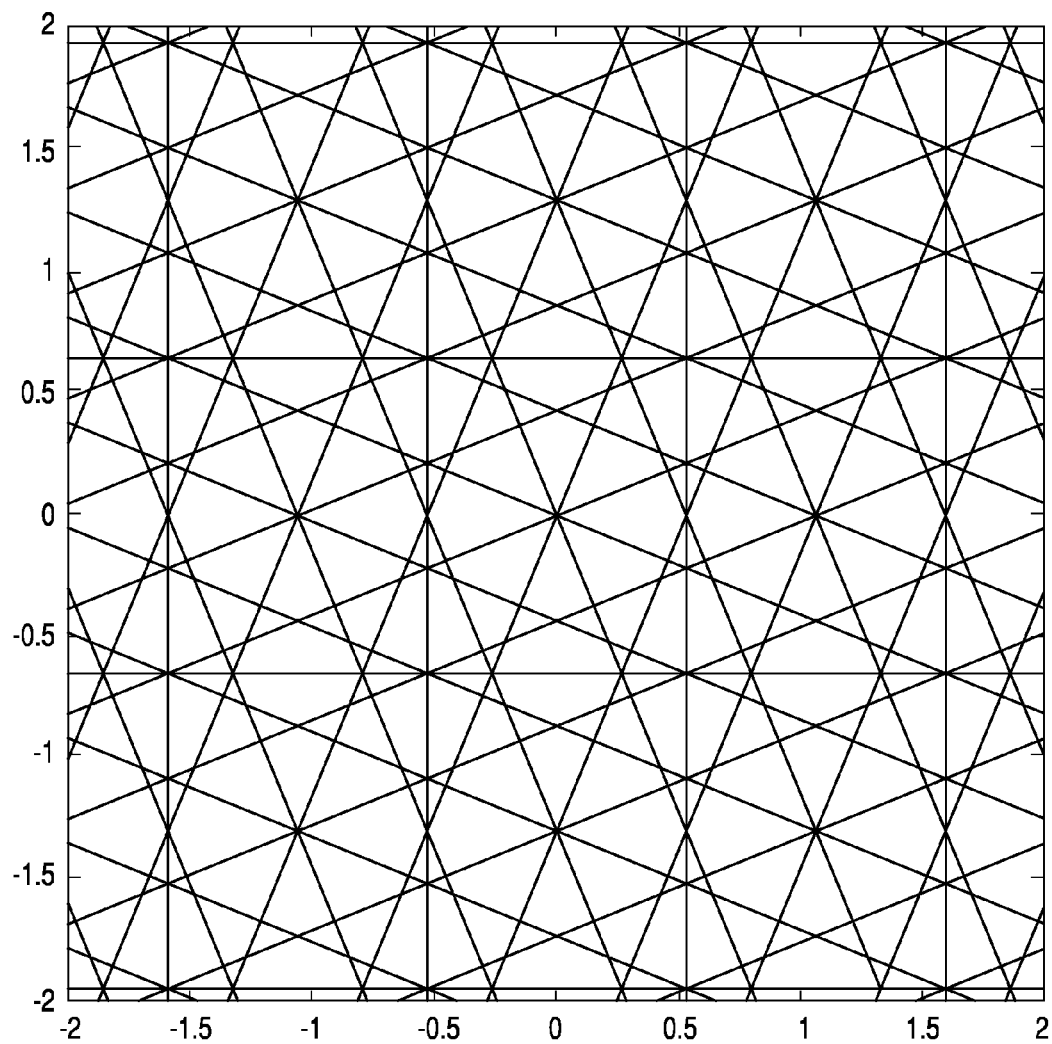
FIGS. 11 and 12 are schematic diagrams of cutter paths which can create cube corner clusters having retroreflective cube corners with cants of 11.2° and −19.5°, respectively.
Figure 12:
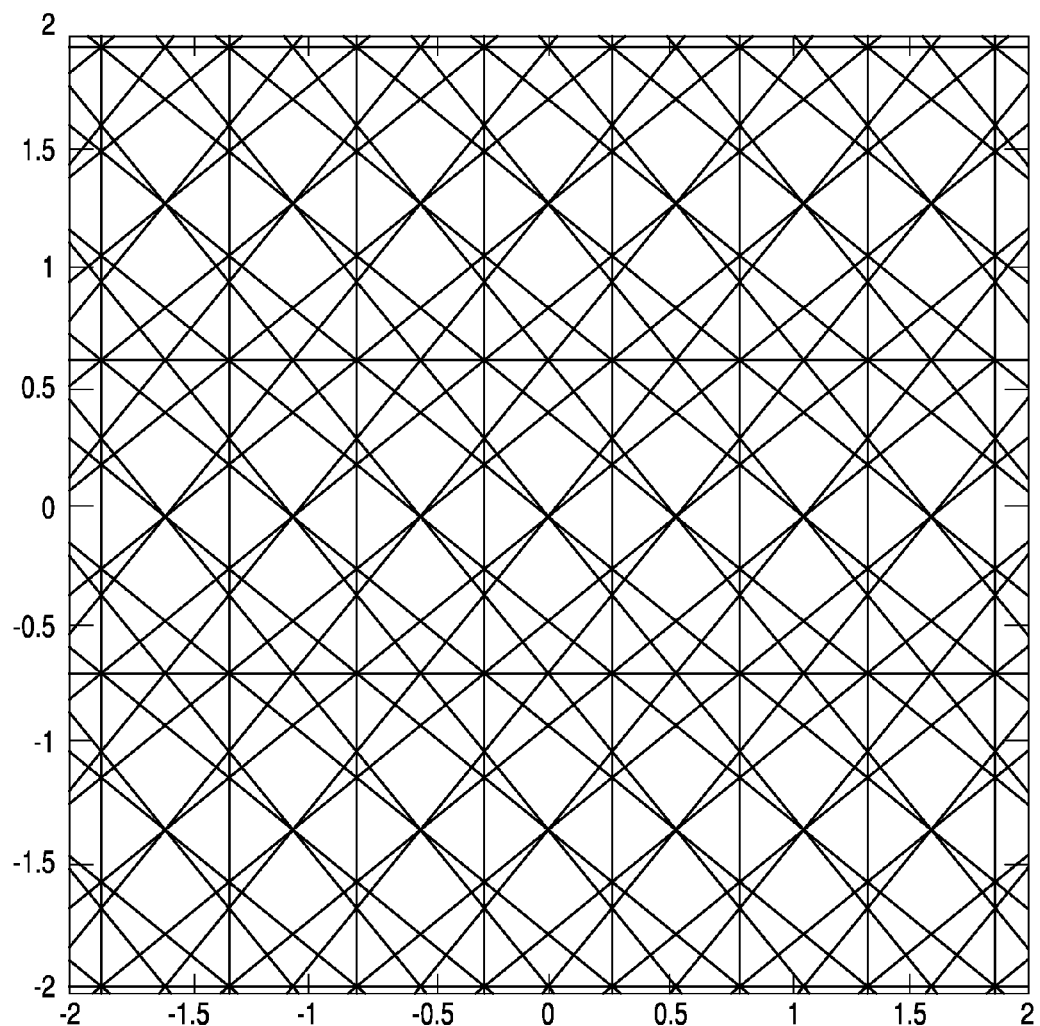

It is also possible to cut negative cant prisms 8 with four orientations present, separated by 90°. FIG. 9 is a schematic diagram of cutter paths which can create cube corner clusters 3 having retroreflective cube corners 8 with negative cant. FIG. 10 is a plan view of an eighth embodiment of the retroreflective sheeting 1 formed by the cutting pattern of FIG. 9 having cube corner clusters 3 that each include cube corners 8 having a negative cant of −9.74°. Such cube corners 8 fill up a larger area of the cluster 3 and so may be more efficient than other previously disclosed embodiments. FIGS. 11 and 12 are schematic diagrams of cutter paths which can create cube corner clusters 3 having a quartet of 90° separated retroreflective cube corners 8 with cants of 11.2° (edge more parallel) and −19.5° (face more parallel), respectively.

Figure 13:
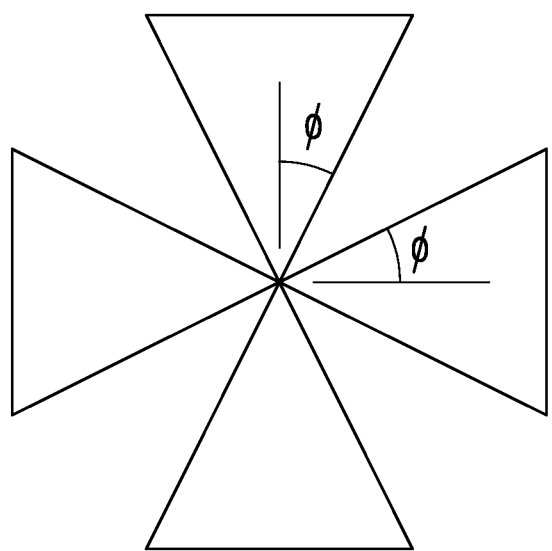
FIG. 13 is a generic diagram of the geometry of embodiments of the invention having a square grid of cube corner clusters.
Figure 14:
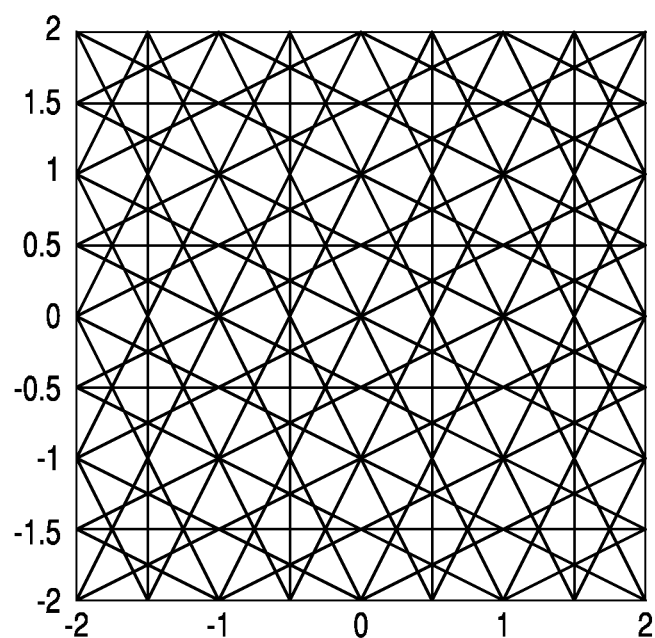
FIGS. 14-16 are schematic diagrams of cutter paths which can create a square grid of cube corner clusters for $\phi$ having tangent values of ½, ⅓ and ⅔.
Figure 15:
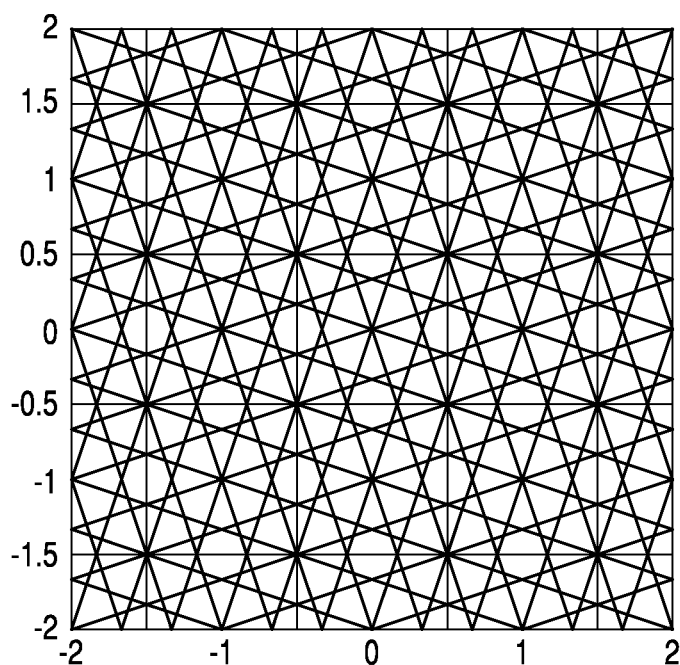
Figure 16:
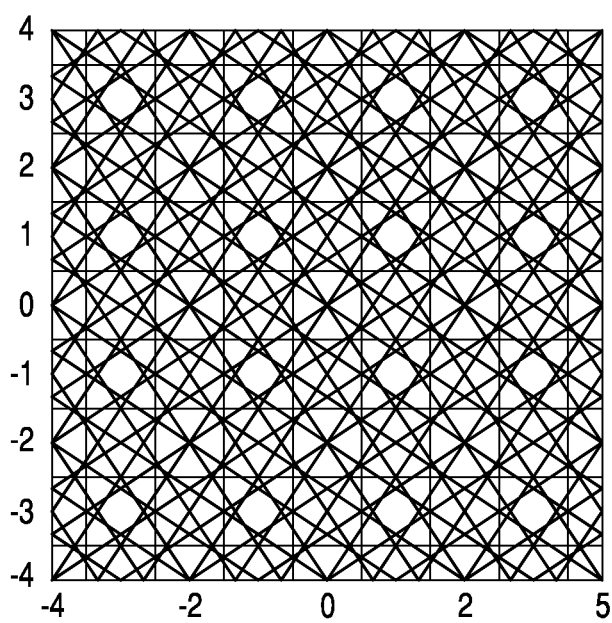

FIG. 13 is a generic diagram of the geometry of embodiments of the invention having cube corner clusters 3 arranged on a square grid that include a quartet of retroreflective cube corners 8 having triangular bases whose orientations are separated by 90°. The cube corners 8 in such square-shaped cube corner clusters 3 are identical in shape and size (although they may have small variations of dihedral angles). Note that the vertex-bisecting angle φ is the same for each of the cube corners 8 of the quartet. As previously indicated, an array of such cube corner clusters 3 can be formed by six sets of parallel rulings made by a ruling or diamond-turning machine. A rulable cutting scheme can be easily determined for such square-shaped cube corner clusters 3 when the tangent of the vertex-bisecting angle φ is set to a simple fraction such as ½, ⅓ and ⅔. FIGS. 14-16 are schematic diagrams of cutter paths which can create such cube corner clusters for such values of φ.

Of course the ease in designing a rulable cutting scheme for such clusters must be balanced against the overall optical performance of the resulting sheeting 1. Accordingly, the optical performance of three embodiments of sheeting 1 utilizing such clusters 3 will now be compared wherein tan φ=½, ⅓ and ⅔, respectively. In evaluating the optical properties of the resulting array of cube corner clusters 3, the following factors were considered:

(1) Retro FF—(retroreflection fill factor) The fraction of the total area made up of triangular cube corner prisms. Note that this fraction is not the ratio of the total area of the prism clusters over the total area of the sheeting; rather, it is the ratio of the total area of only the retroreflective cube corners in the clusters over the total area of the sheeting.

(2) Cap-Y FF—cap-Y fill factor. What fraction of the total area is suitable for scattering light to increase the daytime luminance. In other words, [areas 5 surrounding the prism clusters 3+the areas of the clusters 3 that contribute to daytime luminance] divided by [the total area of the sheeting].

(3) Waste—What fraction of the total area does not contribute to retroreflection or daytime luminance.

|  | Retro FF | Cap Y FF | Waste |
|---|---|---|---|
| tan φ = ½ | 0.32 | 0.36 | 0.32 |
| tan φ = ⅓ | 0.12 | 0.64 | 0.24 |
| tan φ = ⅔ | 0.14 | 0.79 | 0.07 |

From the above table, certain trade-offs in optical performance are clearly evident. For example, retroreflective sheeting 1 having an square grid array of clusters 3 wherein tan φ=½ has the largest area of retroreflectivity (0.32) but the smallest area contributing to daytime luminance (0.36) and largest amount of waste area (0.32) that contributes to neither retroreflectivity or daytime luminance. While the other two embodiments of sheeting 1 wherein tan φ=⅓ and tan φ=⅔ have much larger amounts of area contributing to daytime luminance (0.64 and 0.79 respectively) and much smaller waste areas (0.24 and 0.07, respectively) they also have much smaller areas of retroreflectivity (0.12 and 0.14, respectively). The values in the table are based on the assumption that the non-cube corner prisms 10 in the corners of the clusters 3 do not contribute to Cap-Y. This assumption may not be valid, especially if the non-cube corners 10 are air-backed and the sheeting has a backing film. The values in the table are also based on the assumption that the cube corner clusters 3 are arranged in a grid with a minimum possible spacing, so as to maximize Retro FF. The spacing between clusters 3 can optionally be increased thereby increasing Cap-Y FF and proportionately reducing both Retro FF and Waste.

Figures 17A, 17B:
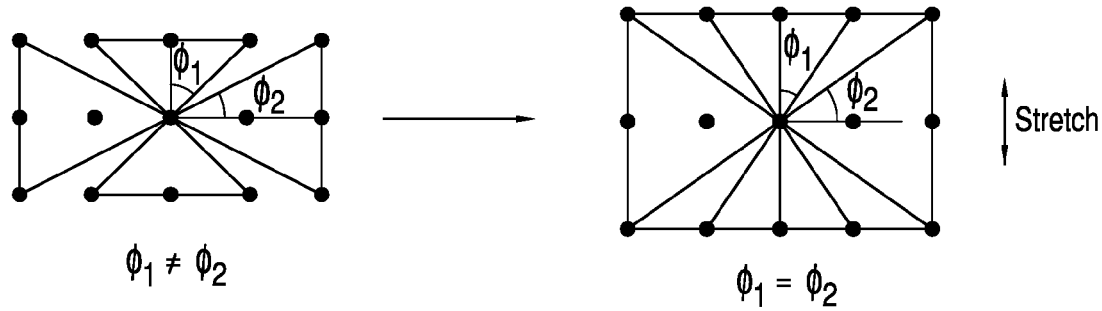
FIG. 17A is a generic diagram of the geometry of embodiments of the invention having a rectangular grid of cube corner clusters.
FIG. 17B is a schematic diagram illustrating a "grid stretching/shrinking" method for determining a rulable cutter scheme for the fabrication of embodiments of the invention having a rectangular grid of cube corner clusters.

Thus far we have considered mostly square cube corner clusters 3 that include a quartet of retroreflective cube corners 8 having triangular bases of a same size and shape that are separated by 90°. These clusters 3 are arranged on a grid of squares such that equal spacing is present in the x and y directions between the centers of quartets 8. It is possible for not all intersection points on a square grid to be occupied by clusters 3. FIG. 17A is a generic diagram of the geometry of embodiments of the invention having rectangularly-shaped cube corner clusters 35 on a square grid. In contrast to the previously-discussed cube corner clusters 3, the cube corners 37 in such rectangular-shaped cube corner clusters 35 are not identical in shape and size. Note that the vertex-bisecting angles φ1 and φ2 are different. Additionally, such rectangular clusters 35 are arranged on a grid of squares such that equal spacing is present in the x and y directions between the centers of quartets. Such an arrangement can be useful, but is not ideal for achieving rotational insensitivity. However, by stretching or squeezing the grid, the angles φ1 and φ2 can be made equal, and the four cube corners 37 can have the same shape and size, and the grid becomes rectangular.

Figure 18:
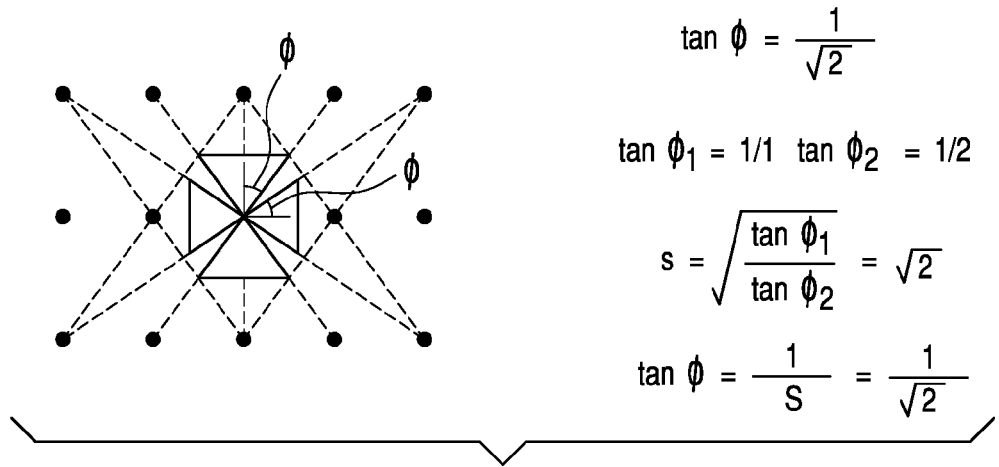
FIG. 18 illustrates a formula that determines the amount of grid stretch necessary to equalize the angles of the common vertices of the retroreflective cube corners in cube corner clusters in a rectangular grid.
Figure 19A:
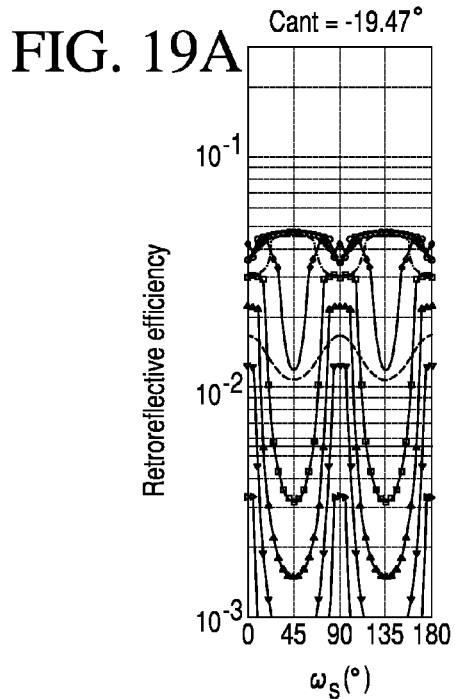
FIGS. 19A-19D are graphs illustrating the retroreflective efficiency over a range of orientation angles $\omega_s$ from 0° to 180° for different entrance angles $\beta$ for quartet air-backed embodiments of the inventive sheeting wherein the retroreflective cube corners in the cube corner clusters have cants of −19.47°, −9.74°, 0.00°, 5.26°, respectively.
Figure 19B:
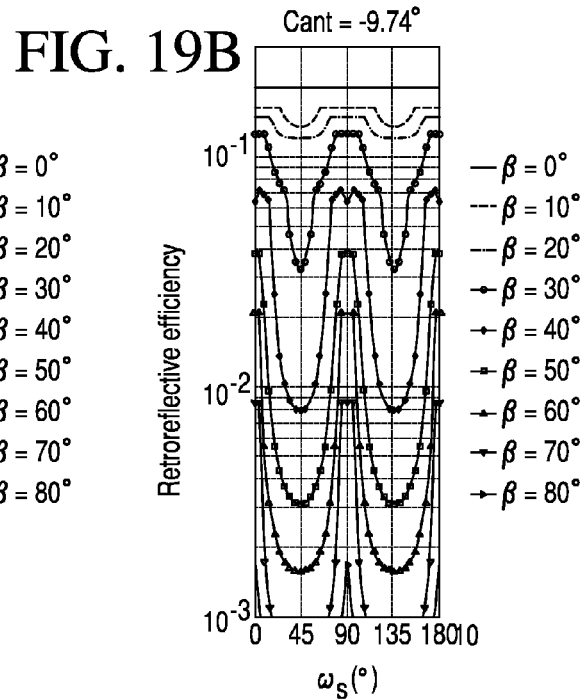
Figure 19C:
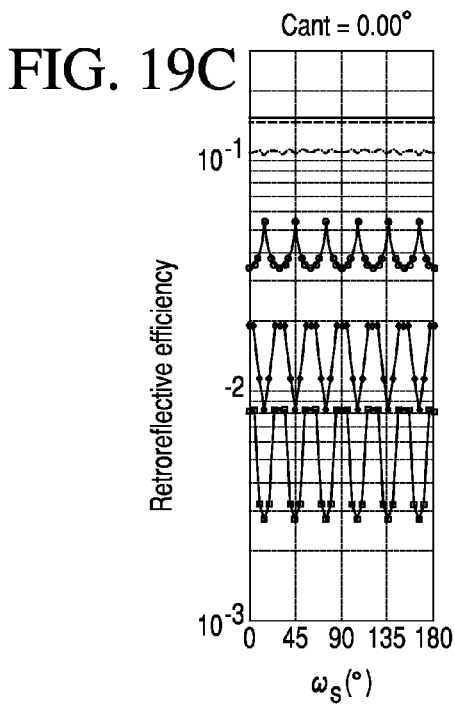
Figure 19D:
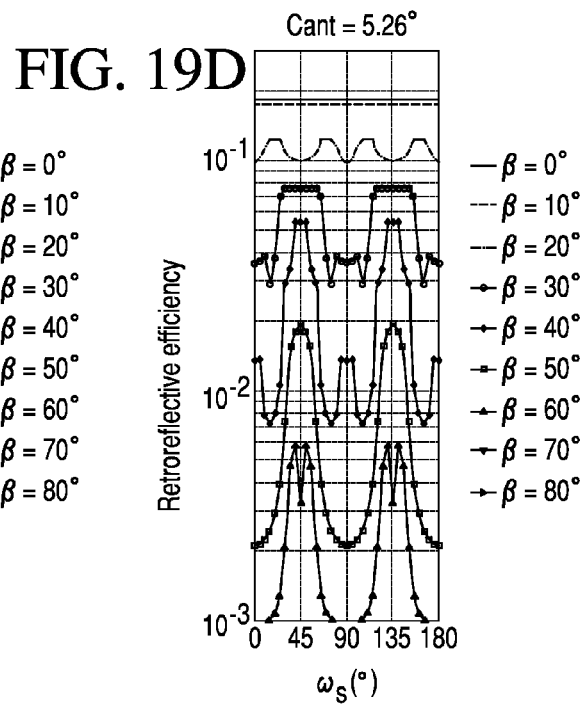
Figure 20A:
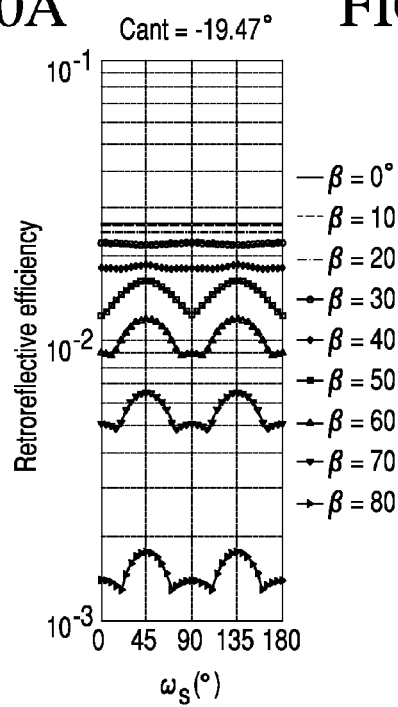
FIGS. 20A-20D are graphs illustrating the retroreflective efficiency over a range of orientation angles $\omega_s$ from 0° to 180° for different entrance angles $\beta$ for quartet metalized embodiments of the inventive sheeting wherein the retroreflective cube corners in the cube corner clusters have cants of −19.47°, −9.74°, 0.00°, 5.26°, respectively.
Figure 20B:
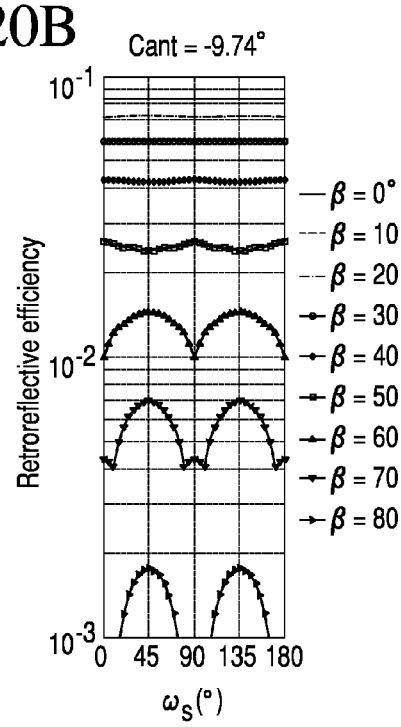
Figure 20C:
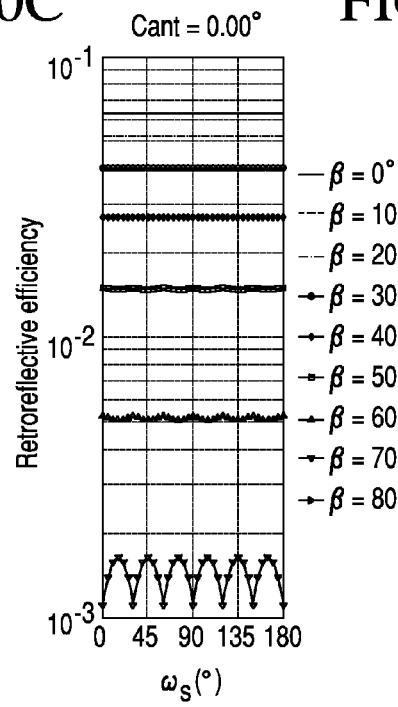
Figure 20D:
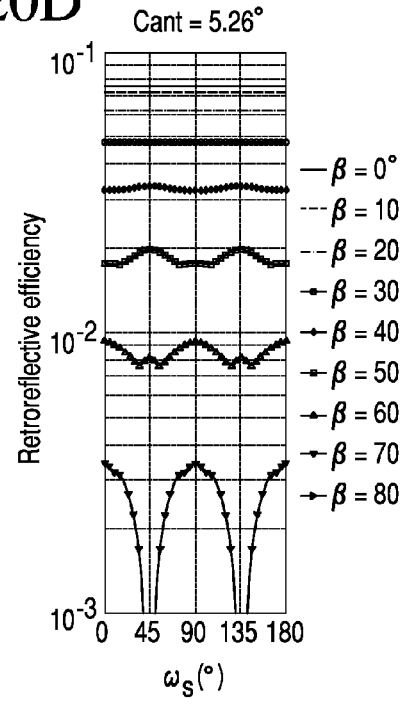

FIGS. 17B and 18 illustrate a "grid stretching/squeezing" method for generating a schematic cutting diagram for fabricating such clusters 35 via rulable cuts for different initial values of φ1 and φ2. In this method, we determine the amount that the grid that we have drawn the cluster 35 on needs to be "stretched" or "squeezed" until φ1=φ2 as shown in FIG. 17B. The amount of stretching or squeezing is referred to as "s". As is indicated in FIG. 18, $$s=\sqrt{\tan\phi1/\tan\phi2}$$

In a case where tan φ1=1.0 and tan φ2=½, $\bar{s}$=√2. Thus the spacing of horizontal rulings will have to be larger than the spacing of vertical rulings by a factor of s or about 1.4142 to define the rectangular grid, while the other four sets of parallel rulings (angled at φ=tan⁻¹ (1/√2) and all negative and complementary angles thereto) will have to pass through the centers of the rectangles by the cutting scheme. The final schematic cutting pattern is illustrated in FIG. 10. The same "grid stretching/squeezing" method can easily be used to determine a schematic cutting pattern for prism clusters 35 wherein φ1 and φ2 are different values. This can be done also for cases where the initial unstretched case is a square grid with equal sized cube corners.

FIGS. 19A-19D are graphs illustrating the retroreflective efficiency over a range of orientation angles ω$_s$ from 0° to 180° for entrance angles β ranging from 0° to 80° for quartet air-backed embodiments of the inventive sheeting wherein the retroreflective cube corners in the cube corner clusters have cants of −19.47°, −9.74°, 0.00°, 5.26°, respectively. It should be noted that these graphs indicate the overall efficiency of the sheeting. Because the retroreflective efficiency of the various sheetings is symmetrical between 0° to 180° and 180° to 360°, each of these graphs has been plotted only for an orientation angle ω$_s$ of 0° to 180°. The graph of FIG. 19B indicates that a sheeting with quartet-type clusters 3 having retroreflective cube corners canted at an angle of −9.74° has the highest retroreflective efficiency at low entrance angles (β), while the graph of FIG. 19A indicates that such a sheeting having retroreflective cube corners canted at an angle of −19.47° has the lowest retroreflective efficiency at low entrance angles (β).

FIGS. 20A-20D are graphs illustrating the retroreflective efficiency over a range of orientation angles ω$_s$ from 0° to 180° for entrance angles β ranging from 0° to 80° for quartet metalized embodiments of the inventive sheeting wherein the retroreflective cube corners in the cube corner clusters have cants of −19.47°, −9.74°, 0.00°, 5.26°, respectively. Again, the graph of FIG. 20B indicates that a sheeting with quartet-type clusters 3 having retroreflective cube corners that are canted at an angle of −9.74° has the highest retroreflective efficiency at low entrance angles, while the graph of FIG. 20A indicates that such a sheeting having retroreflective cube corners canted at an angle of −19.47° has the lowest retroreflective efficiency at low entrance angles.

FIG. 21 is a table that compares both the retroreflective and daytime reflective characteristics for quartet embodiments of the inventive sheeting whose retroreflective cube corners in the cube corner clusters have different cants. Like the previously discussed table, FIG. 21 compares different sheetings on the basis of Retro FF, Cap-Y FF and Waste. FIG. 21 also compares these different sheetings on the basis of a fourth factor, "Retro Waste", which is defined as the fraction of the area of the sheeting not contributing to daytime luminance that is also not contributing to retroreflection. The comparative results of the table of FIG. 21 tell a different story than the retroreflective efficiency graphs of FIGS. 19A-19D and 20A-20D. Unlike FIG. 21, FIGS. 19A-19D and 20A-20D include effects of reflection and/or transmission of the air or metallic prism backing, and the geometric efficiency of the variously canted cube corner prisms for different directions of incident light. For example, FIG. 21 indicates that a quartet sheeting having clusters 3 that include retroreflective cube corners 8 having a cant of −19.47° has small amounts of both Waste and Retro Waste and, for the ten types of sheetings compared, the second highest value for Retro FF. However, this sheeting shows the lowest retroreflective efficiency at low entrance angles of all the sheetings considered in FIG. 20, mainly because of the low geometric efficiency. Thus the ranking of the sheeting whose retroreflective cube corners have a cant of −19.47° changes from first or second to last when measured by a more encompassing set of optical criteria.

Figure 22A:
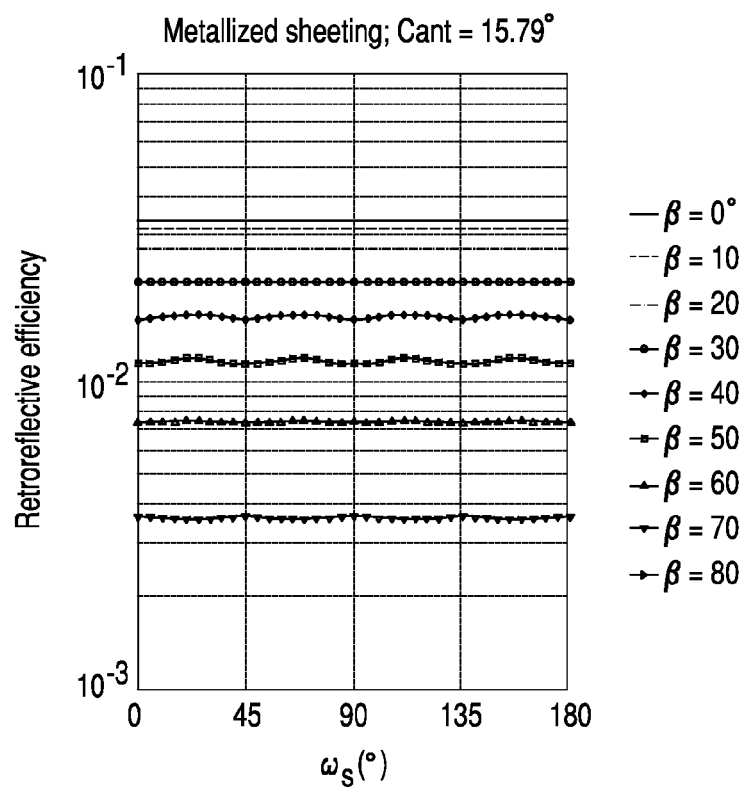
FIGS. 22A and 22B are graphs illustrating the retroreflective efficiency over a range of orientation angles $\omega_s$ from 0° to 180° for metalized and air-backed octet embodiments of the inventive sheeting, respectively, wherein the retroreflective cube corners in both embodiments have a cant of 15.79°.
Figure 22B:
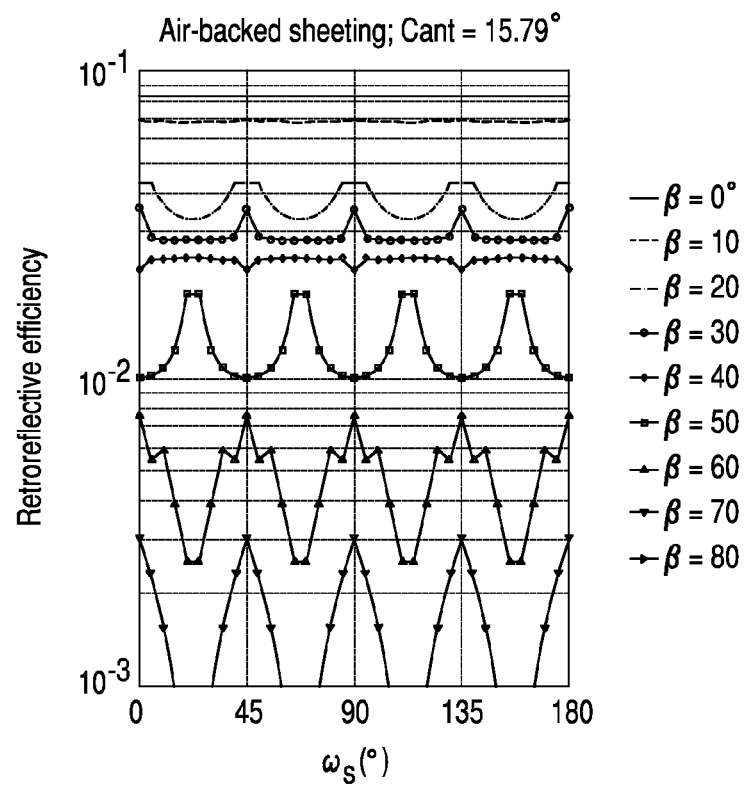
Figure 23A:
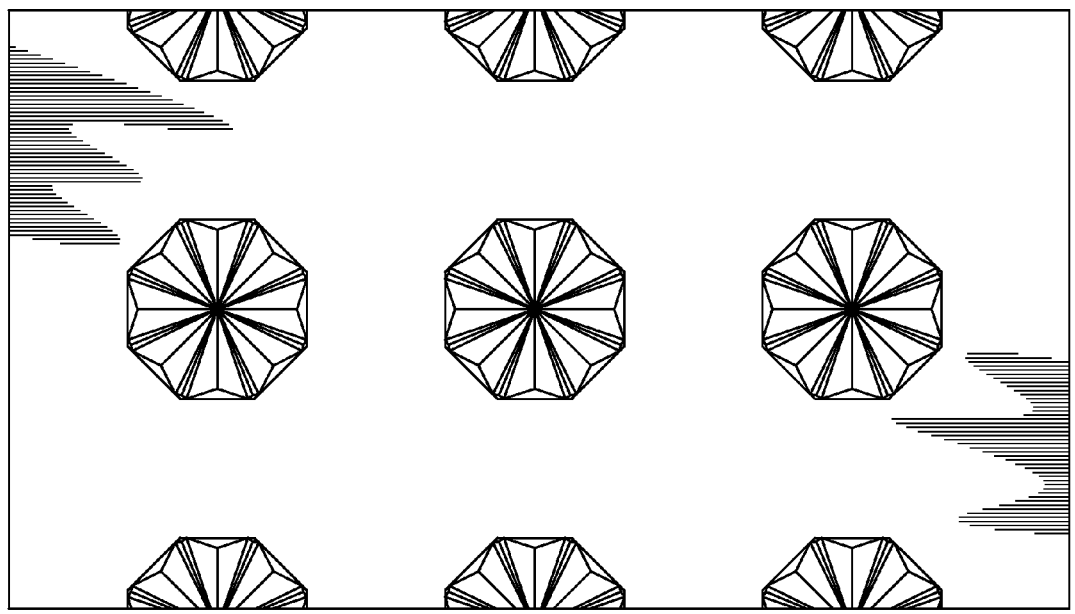
FIGS. 23A and 23B are a plan and enlarged perspective view of an embodiment of the inventive sheeting wherein eight of the prisms in each cluster are retroreflective cube corners.
Figure 23B:
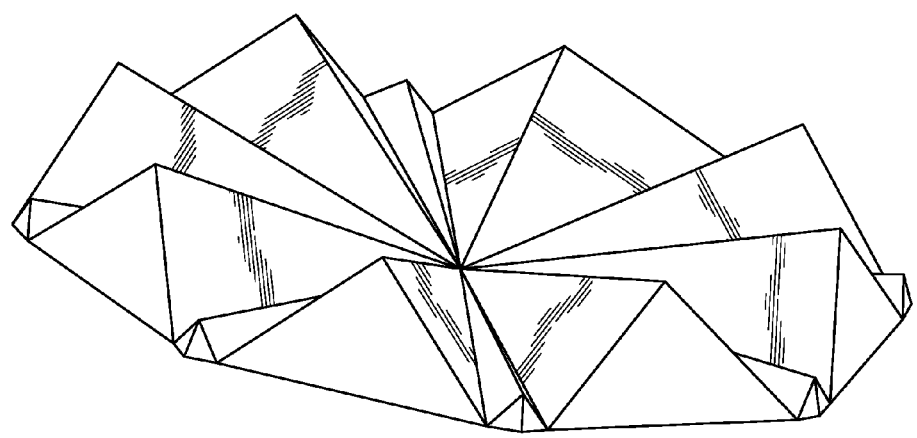

FIGS. 22A and 22B are graphs illustrating the retroreflective efficiency over a range of orientation angles $\omega_s$ from 0° to 180° and for entrance angles $\beta$ ranging from 0° to 80° for metalized and air-backed octet embodiments of the inventive sheeting, respectively. In both cases, the retroreflective cube corners of the clusters have a cant of 15.79°. While the metalized octet sheeting has extremely low directional sensitivity for all of the entrance angles, the retroreflective efficiency of the air backed octet sheeting is higher for entrance angles $\beta$ ranging from 0° to 40°. FIGS. 23A and 23B are a plan and enlarged perspective view of the octet sheeting wherein the measurements of the graphs of FIGS. 22A and 22B were modeled from.

The invention further encompasses a method for forming the rotationally insensitive retroreflective prism sheeting 1 of the invention. In one implementation of this method, the surface of a first tooling substrate is first textured in a manner to promote a high Cap-Y FF in the final product. Such a textured tooling substrate surface may be procured in advance, or created on a smooth, continuous tooling surface via chemical or electrical etching, electroplating, laser engraving, grinding, EDM, or the like. Next, a pattern of recesses is formed on the textured surface where the retroreflective clusters 3 are to be. Individual recesses corresponding to each of the desired cube corner clusters may be formed in the textured surface using, for example, photolithography/ etching or ion milling. Alternatively, in a situation where the desired cube corner clusters in the final product are to be closely-spaced together along one direction, the recesses may take the form of parallel channels using, e.g. diamond turning, ruling, wire or plunge EDM. In either case, a "negative" copy of the textured, recessed surface is formed from a cuttable material by, for example, electroforming, thereby creating a cuttable tooling surface having either "islands" of raised material outlining the clusters, or strips of raised material which may be transversely cut to form the desired islands of raised material outlining the cube corner clusters. Finally, in both cases, cube corner clusters 3 are formed by cutting a pattern of substantially straight vee grooves (such as those illustrated in FIGS. 6, 9, 10, 11, 12, 14, 15 and 16) into the islands of raised material on the face of the cuttable substrate. Advantageously, each vee groove is straight and has a same depth throughout its length. In the case where parallel channels were cut in the first tooling substrate instead of discrete recesses, texturing may be added between the cube corner clusters in the regions of the tooling surface where the texturing was obliterated by the transverse cutting of the parallel channels.

In an alternative implementation of the method of the invention, channels are cut in the smooth face of a cuttable tooling substrate where the textured areas should be. The cutting can be implemented by a vee groove cutter with sharp tip, or flat tip, or curved tip. Alternatively the channels may be cut by wire or plunge EDM. The cutting of these channels not only defines the textured surface but also forms raised islands of material that outlines the shape of the cube corner clusters. Next, the bottom surfaces of the channels are textured. This would normally be accomplished by texturing the entire cut substrate. Such texturing may be accomplished for example by chemical or electrical etching, electroplating, or laser engraving. Finally, cube corner clusters are formed by cutting a pattern of substantially straight vee grooves (such as those illustrated in FIGS. 6, 9, 10, 11, 12, 14, 15 and 16) into the raised material formed on the face of the cuttable substrate by the channels.

In still another alternative implementation of the method, the textured surface on the face of the first substrate may be provided first, followed by providing discrete areas of raised material on the textured surface, followed by the step of cutting the discrete areas of raised material with a pattern of straight vee groove rulings (such as those illustrated in FIGS. 6, 9, 10, 11, 12, 14, 15 and 16) to form the clusters of cube corners.

While the invention has been described in detail with particular reference to certain preferred embodiments thereof, it will be understood that variations and modifications can be effected within the spirit and scope of the invention, which is limited only by the appended claims and equivalents thereof.

What is claimed:

1. Retroreflective prism sheeting, comprising a plurality of discrete clusters of cube corners formed from a transparent material that are separated from one another completely by a surface, each cube corner having a base edge not collinear or parallel with the base edges of cube corners on either side of it, wherein the cube corners in each cluster are defined by a set of straight vee grooves, each groove having substantially a same direction throughout its length, wherein the cube corners have different orientations such that the retroreflectivity of the sheeting is substantially rotationally insensitive.

2. The retroreflective prism sheeting defined in claim 1, wherein the surface separating the discrete clusters of cube corners is textured so as to be light-scattering.

3. The retroreflective prism sheeting defined in claim 1, wherein four or more of the cube corners in each cluster have edges that converge into a central point within the cluster.

4. The retroreflective prism sheeting defined in claim 1, wherein the cube corners of the clusters include symmetrical pairs of cube corners.

5. The retroreflective prism sheeting defined in claim 4, wherein the cube corners of each cluster includes at least two symmetrical pairs of cube corners, and wherein one of the edges of each of the cube corners in the symmetrical pairs is at right angles to one of the edges of the two cube corners on either side of it.

6. The retroreflective prism sheeting defined in claim 1, wherein the cube corner clusters have straight sides.

7. The retroreflective prism sheeting defined in claim 6, wherein the shapes of the cube corner clusters are polygonal, and all of the cube corners share a common vertex which is located at the center of the polygonal shape.

8. The retroreflective prism sheeting defined in claim 7, wherein the cube corners within the cluster are arranged in symmetrical pairs of cube corners about the common vertex.

9. The retroreflective prism sheeting defined in claim 1, wherein the surface around the clusters is defined by a vee groove.

10. The retroreflective prism sheeting defined in claim 9, wherein the vee groove defining the surface is a continuation of the sides of cube corners in different clusters.

11. The retroreflective prism sheeting defined in claim 1, wherein the surface around clusters is defined by a flat surface; and wherein the flat surface is in contact with all of the discrete clusters.

12. The retroreflective prism sheeting defined in claim 1, wherein the surface around clusters is defined by a curved surface.

13. The retroreflective prism sheeting defined in claim 1, wherein the cube corner clusters are uniformly spaced apart from one another such that the surface separating the clusters forms a uniform grid-like pattern.

14. The retroreflective prism sheeting defined in claim 1, wherein the cube corners in the clusters are canted.

15. The retroreflective prism sheeting defined in claim 1, wherein the cube corners of the clusters are coated on one side with a specularly reflecting metal coating.

16. The retroreflective prism sheeting defined in claim 1, further comprising a sealed backing film that provides air-cells behind the clusters.

17. The retroreflective prism sheeting defined in claim 16, wherein the sealed backing film is attached to the surface separating the clusters.

18. Retroreflective prism sheeting, comprising a plurality of discrete clusters of cube corners formed from a transparent material, each of the clusters having straight, polygonal sides and the clusters being separated from one another completely by a textured surface, the cube corners in each cluster being defined by a set of straight vee grooves, each vee groove having a substantially same direction throughout its length, each cube corner having a base edge that is not common with a base edge of another cube corner, and the cube corners in the clusters having different orientations such that the aggregate retroreflectivity of the sheeting is substantially rotationally insensitive.

19. The retroreflective prism sheeting defined in claim 18, wherein the cube corners share a common vertex that is centrally located within the polygonal shape of the clusters defined by the straight sides and arranged in symmetrical opposing pairs with respect to the common vertex.

20. The retroreflective prism sheeting defined in claim 18, wherein the textured surface around clusters is defined by a vee groove.

21. The retroreflective prism sheeting defined in claim 20, wherein the vee groove defining the textured surface is a continuation of the sides of cube corners in different clusters.

22. The retroreflective prism sheeting defined in claim 18, wherein the textured surface around clusters is defined by a flat surface; and wherein the flat surface is in contact with all of the discrete clusters.

23. The retroreflective prism sheeting defined in claim 18, wherein the textured surface around clusters is defined by a curved surface.

24. The retroreflective prism sheeting defined in claim 18, wherein the cube corner clusters are uniformly spaced apart from one another such that the optically textured surfaces surrounding the clusters form a uniform grid-like pattern.

25. A method for forming rotationally insensitive retroreflective prism sheeting comprising:
    forming cube corners in a substrate by cutting a face of the substrate with a pattern of straight vee grooves, each vee groove having a substantially same direction throughout its length, wherein the resulting cube corners have different orientations;
    providing a textured surface on the face of one of the substrate and a replica of the substrate that defines discrete cube corner clusters surrounded by a textured surface, and
    using one of the substrate and a replica thereof to form retroreflective prism sheeting from a transparent material having a plurality of discrete clusters of cube corners that are separated from one another completely by a textured surface, wherein each cube corner in the clusters has a base edge not collinear or parallel with the base edges of cube corners on either side of it, and cube corners in each cluster have different orientations.

26. The method for forming retroreflective prism sheeting defined in claim 25, wherein the textured surface on the face of the substrate is provided first, followed by providing discrete areas of raised material on the textured surface, followed by said step of cutting the discrete areas of raised material with a pattern of straight vee groove rulings to form said clusters of cube corners.

27. The method for forming retroreflective prism sheeting defined in claim 25, wherein the cutting of the cube corners in the substrate is accomplished by cutting a first set of vee grooves with a slightly tilted cutter, rotating the substrate 180°, and then cutting a second set of vee grooves to create mirroring in the resulting cube corners that results in increased divergence of light returning from the sheeting.

28. The method for forming retroreflective prism sheeting defined in claim 27, wherein the first set of vee grooves are the odd grooves, and the second set of vee grooves are the even grooves.

29. The method for forming retroreflective prism sheeting defined in claim 25, further including the step of texturing vee grooves between the cube corners to increase observation angularity.

* * * * *